United States Patent [19]

Metz

[11] 3,788,383
[45] Jan. 29, 1974

[54] APPARATUS FOR THE CONTINUOUS EXTRACTION OF ELECTROSLAG REMELTED METALS

[75] Inventor: Paul Metz, Emile Metz, Luxembourg

[73] Assignee: Acieries Reunies de Burbach-Eich-Dudelange S.A., Luxembourg, Luxembourg

[22] Filed: Apr. 14, 1971

[21] Appl. No.: 133,993

[30] Foreign Application Priority Data
Apr. 16, 1970 Luxembourg.......................... 60743

[52] U.S. Cl................. 164/156, 164/252, 164/281, 164/337
[51] Int. Cl...................... B22d 17/32, B22d 27/02
[58] Field of Search... 164/113, 119, 154, 155, 156, 164/284, 306, 335, 337, 281, 82, 52, 254–259

[56] References Cited
UNITED STATES PATENTS
2,825,104  3/1958  Jones................................ 164/83 X
3,234,608  2/1966  Peras.................................... 164/52
3,587,718  6/1971  Hopkins............................. 164/82 X
3,650,311  3/1972  Fritsche............................ 164/82 X
2,445,670  7/1948  Hopkins............................... 154/252
3,608,616  9/1971  Schneider........................... 164/154

FOREIGN PATENTS OR APPLICATIONS
444,390  2/1968  Switzerland........................ 164/337

Primary Examiner—J. Spencer Overholser
Assistant Examiner—John E. Roethel
Attorney, Agent, or Firm—Karl F. Ross

[57] ABSTRACT

An electroslag melting (e.g. remelting) of metal, under a slag or fused-flux layer, is carried out in a crucible provided with a discharge neck which is received with clearance in a removable, replaceable and interchangeable continuous-ingot mold. The liquid/solid metal interface is maintained within the mold which has a liquid-free surface exposed to reducing or non-oxidizing gas pressure maintained to balance the hydrostatic pressure of the metal bath and flux layer in the melting chamber. As a consequence, the rate of flow of the metal from the melting crucible to the ingot mold is automatically controlled to equal the rate at which the ingot is withdrawn.

10 Claims, 3 Drawing Figures

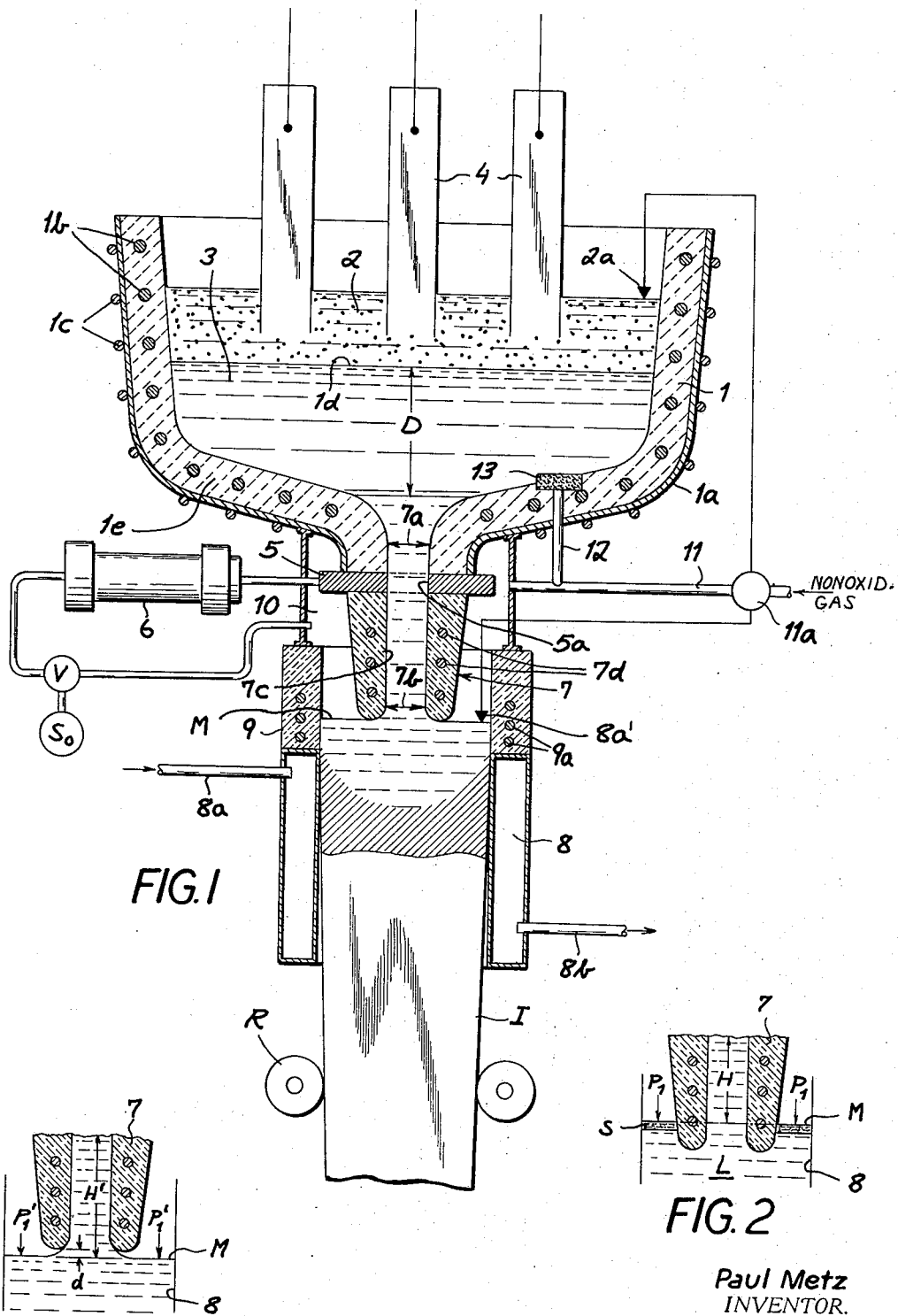

APPARATUS FOR THE CONTINUOUS EXTRACTION OF ELECTROSLAG REMELTED METALS

FIELD OF THE INVENTION

My present invention relates to an apparatus for the continuous production of elongated metal bodies, especially ingots, bars, billets and blooms of electrically remelted metals; more particularly, the invention relates to an electroslag remelting apparatus in which a continuous withdrawal of metal is effected.

BACKGROUND OF THE INVENTION

Electrical methods for remelting metals, especially electroslag remelting, refining or melting, generally make use of a fused layer of nonmetallic material, generally referred to as flux, which overlies the metallic bath and serves as an intermediary between the electrode and the metal. The slag which may overlie the metal bath in a layer continuously interacting with the metal and serving as a medium through which electric current is caused to flow to provide the resistive heating necessary to melt the metal or maintain the metal in a molten state. For convenience, such systems, using flux or slag as an electrode-submerging medium, will be referred to hereinafter as "electroslag remelting" or "electroslag melting."

In general, two or more flux-submerged electrodes are spaced apart in the vessel and terminate just above the molten metal layer therein. An electric current or discharge may pass between the electrodes, through the molten metal, to melt the electrodes and/or additional metal and produce the physical, mechanical and chemical interaction of melting, fusing and purification of the melt in interaction of the hot slag or flux with the metal. The metal derive from the electrodes or may be provided in the form of coherent units, e.g. pieces of scrap or pellets, granules or briquettes of metallic iron or, as metal powders, and in any form available. In principal, the slag or flux layer of electroslag remelting and melting processes not only provides a medium capable of discharge or current flow, but also of chemically reacting with molten metal for purification and providing a blanket which excludes air or other detrimentally reactive substances from the molten metal.

It has also been proposed to provide continuous casting systems in which the molten metal is permitted to flow into a tubular ingot mold and to solidify therein, the ingot being continuously withdrawn from the mold.

Neither method has been fully successful heretofore because of the limited production rate, the fact that control of the flow of the liquid metal into the ingot mold is difficult, and because complicated apparatus is required when, for example, different shapes are to be cast. The difficulty is compounded by the fact that it may be desirable to continuously cast different flow cross-sections or cross-sectional configurations and hence requiring different rates of flow of the molten metal. Under these circumstances, conventional flow-regulation systems have proved to be inadequate.

OBJECTS OF THE INVENTION

It is the general object of the present invention to provide an improved apparatus for the continuous remelting of metal and the formation of a continuous shaped product which is of improved efficiency and affords simplicity of control and variability of the product. Another object of the invention is to provide an apparatus for continuously melting and resolidifying metal whereby the aforementioned disadvantages can be avoided.

Still another object of the invention is to provide an apparatus for the continuous withdrawal of molten metal from an electroslag remelting crucible in which the control of the flow rate is substantially automatic and can compensate for variations in the flow cross-section of the ingot mold and other parameters.

Yet another object of the invention is the provision of an apparatus for the continuous remelting and resolidification of metal to produce a variety of shapes at higher rates than have been realized heretofore with less difficulty in controlling the system and with increased efficiency.

SUMMARY OF THE INVENTION

I have now found that these objects can be attained in a remelting system using electroslag principles where the remelting crucible and the solidification mold communicate with one another but are functionally independent and are so constructed and arranged that the liquid/solid interface is maintained in the ingot mold and the liquid forms of meniscus therein which is exposed to nonoxidizing or reducing gas pressure. The gas pressure, according to this invention is arranged to substantially balance the hydrostatic head attributable to the metal bath and the slag or flux layer overlying same in the melting crucible. In other words the rate of flow of the molten metal is controlled by the withdrawal of the ingot from the mold such that the meniscus remains at a substantially constant location during the casting and solidification process as a result of the controlled pressure applied to the free surface of the melt within the ingot mold.

According to the present invention, therefore, the remelting crucible and the mold are functionally independent and the latter is replaceable, interchangeable and exchangeable with other molds of different configurations and flow cross-sections. According to an essential feature of the invention, the remelted metal is drawn from the bath thereof below the slag or flux layer so as to maintain a free surface of the melt, e.g. the metal or a slag layer, which is under a nonoxidizing or reducing gas pressure equal to the pressure exerted by the column of metal and slag above the predetermined meniscus level. By separating the remelting and solidification operations, it has become possible to allow a single remelting crucible to feed a plurality of solidification molds each associated with the remelting crucible in the manner already described to provide the necessary free space and control the gas pressure. It has also been found that these techniques are especially suitable for the production of bars or continuous ingots of small cross-section at maximum output without any of the disadvantages mentioned earlier of continuous casting systems.

The electroslag process may use consumable or nonconsumable electrodes, in accordance with conventional techniques, and, according to the invention, makes use of an apparatus consisting of at least two vessels, namely the remelting and the solidification vessel or ingot mold which is open at its opposite ends. According to the present invention in its specifics, the remelting crucible contains only the flux or slag bath in which the, or each, electrode is immersed as a layer above the layer of molten metal, the latter being of a depth only sufficient to allow decantation of impurities. It will be appreciated that within the crucible the interaction of the flux or slag with the metal, and of added quantities of metal with previously smelted metal, etc., leads to a separation of impurities from the melt. These impurities rise into the slag or flux layer and, for the purposes of the present invention, it has been found to be desirable to maintain a depth of molten metal with the crucible only sufficient to allow a decantation of impurities into the slag layer.

The crucible is provided with one or more discharge tubes which may be preferably of large flow cross-section, the flow cross-section being immaterial to the cross-sections of the ingot molds with which the discharge tubes or necks register. Each tube or neck is preferably received with clearance in the respective mold so that a liquid meniscus is exposed to the pressurizable chamber above the ingot mold whose nonoxidizing or reducing pressure is controlled in accordance with the principles advanced earlier. The neck or tube of the crucible may be immersed in the liquid within the ingot mold or may be spaced slightly above the meniscus by several millimeters. As indicated, the ingot molds may have cross-sections and configurations which are independent of the flow cross-section of the discharge tubes of the crucible. In fact, the dimensions and cross-sections of the ingot molds need correspond only to the profile of the metal bodies to be produced and their dimensions. Above the, or each, ingot mold I provide a respective pressure chamber in which the nonoxidizoning or reducing gas pressure is regulated automatically to balance the hydrostatic head or equivalent pressure of the metal within the crucible, thereby controlling automatically the outflow of liquid metal into the mold as a function of the speed at which the ingot is withdrawn so that the meniscus of the metal or slag layer overlying same in the lingot mold remains at a substantially constant location.

It has been found to be advantageous, as far as apparatus aspects of the present invention are concerned, to provide means for supplying gas under pressure to the gas chamber above the ingot mold and to connect this chamber with a valve having a back pressure determined by the liquid head as noted earlier. Furthermore, heat losses from the otherwise cool ingot mold may be prevented by providing a thermally insulating zone in the region of the meniscus with or without heating elements and it has also been found to be desirable to provide such heating means in the discharge tube or neck of the crucible. Finally, pressure-controlled cut-off means may be provided at the, or each, tube or neck to terminate the flow of molten metal into the ingot mold or to permit the flow to begin again; such shutter means need not, however, control the rate of flow of the liquid metal to the ingot mold, since this control is provided automatically as indicated above.

DESCRIPTION OF THE DRAWING

The above and other objects, features and advantages of the present invention will become more readily apparent from the following description, reference being made to the accompanying drawing in which:

FIG. 1 is a vertical cross-sectional view partly in diagrammatic form, of an apparatus illustrating the present invention;

FIG. 2 is a diagrammatic detail view showing an arrangement of the discharge tubes and the meniscus; and FIG. 3 is a view similar to FIG. 2 of another embodiment.

SPECIFIC DESCRIPTION

In FIG. 1 of the drawing I have shown a system, according to the present invention, which comprises a ceramic crucible 1 for the remelting of metal under a slag or flux layer 2 to form a molten-metal bath 3 in accordance with conventional practices. The metal within the bath is, of course, liquid in its entirety and melting is carried out in accordance with electroslag principles with the aid of electrodes 4 immersed in the flux/slag layer and connected, for example, to a three-phase source which passes electric heating current between the pairs of the electrodes in turn. In principle, the heat loss from the crucible may be reduced by forming a crucible of a layer of heat-insulating ceramic 1 internally of a metal shell which has been shown diagrammatically at 1a in FIG. 1. Furthermore, electric heating elements as illustrated at 1b may be provided in the wall or as a wrapping 1c therearound.

The crucible 1 is dimensioned to have the necessary horizontal section to accommodate the electrodes used. The greater the capacity, of course, the larger will be the number or the cross-section of electrodes spaced apart in the flux/slag layer. However, the depth D of the metal bath is made as small as possible consistent with the height necessary to allow decantation of the impurities from the molten metal. The free large horizontal section/vertical height ratio characterizing the shallow-bath crucible provides a maximum interfacial area at 1d for heat exchange and chemical reaction between the flux/slag layer and the metal bath.

The crucible 1 is provided with a bottom 1e which converges slightly downwardly to a plurality of discharge tubes or necks 7, only one of which has been shown in the drawing. However, each of the discharge tubes may be constructed similarly and may be provided with respective ingot molds as will be apparent hereinafter.

The bottom orifice 7a of the crucible may equal the discharge orifice 7b of the neck in diameter and configuration so that the internal basis 7c of the neck is generally cylindrical. The tube 7, moreover, is provided with a closure device represented generally at 5 or 6. The closure device comprises a slide 5 provided with an aperture 5a which registers with the passage 7c in the open position of the closure device. When, however, the slide 5 is shifted to the right or left, by a cylinder 6 pneumatically controlled by the pressure in chamber 10 (described hereinafter) or by pressure from an auixilary source represented at S and delivered through the valve V, the flow of liquid can be terminated. The valve V may be automatically or manually operated to start the flow of molten metal or to stop it. Similarly, the control device 6 may be regulated by the pressure in chamber 10 so that, should the meniscus in the mold suddenly rise or fall beyond the predetermined limit the flow of metal will be cut off. In any event, the shutter 5 is not used to control the rate of flow of the metal.

Each tube 7 is received within an ingot mold 8 which may be of the liquid-cooled type. In this case, the mold walls are provided with cooling ducts which are supplied with cooling water by a feeding tube 8a the depleted coolant being led away at 8b. The ingot mold 8 is of the type used for the continuous casting of circular cross-section, square cross-section or flat (rectangular) cross-section in conventional continuous casting systems. At the upper ends of the ingot molds 8, a hermetic seal is formed with a housing 10a defining a chamber 10 which is also sealed against the floor of the crucible 1. The orifice 7b of the tube 7 may lie somewhat above the meniscus M of liquid metal formed in the ingot mold 8 as illustrated in FIG. 3, for example, in which a distance D of several millimeters is provided between the meniscus level and the discharge end of the tube 7. However, the tube 7 may also be immersed to a depth of several millimeters within the molten metal as illustrated in FIG. 2. It should be understood that the term "molten metal" as here used to describe the liquid forming the meniscus is intended to include also any slag layer that may form above the metal melt solidifying within the ingot mold. In practice, a steady-state is created in which the gas pressure P, of chamber 10, exerted downwardly upon the liquid L above the solidifying interface in the ingot mold, balances the hydrostatic head H of the flux/slag layer 2 and the melt 3 thereabove. The meniscus thus lies at a constant level and the flow rate at which the metal L solidifies within the ingot mold.

Where the tube 7 terminates above the meniscus M, one chooses the level M of the liquid in the ingot mold such that the continuous stream of liquid metal pours in a quiescent manner without splashing or turbulence.

In each case, a meniscus of the metal in ingot mold 8 is controlled by maintaining the gas pressure/hydrostatic pressure balance mentioned earlier. The upper portion of the metal in the ingot mold remains permanently in a liquid state and where the flow rate of the metal is relatively low, in a case of small-cross section cast body, the supernatant slag layer S prevents premature coolant. In addition, it is possible to reduce the heat loss in the area of the meniscus as represented at 9 by providing the wall of this part of the ingot of the ingot mold of a thermally insulating material or, alternatively, incorporating heating elements 9a of the resistive-heating type therein. To prevent crust formation within the tube 7 or in contact therewith, e.g. where the slag layer may contact the tube, the latter may be provided of thermally insulating material or can be formed with resistive-heating elements as shown at 11d.

The flow cross-section of discharge tube 7, which is integral with the crucible 1, may be relatively large and is, in any event, independent of the flow velocity of the liquid metal. Thus tube merely establishes intercommunication between the crucible 1 and the ingot mold 8 and does not enter into the control of the volume of metal which is cast within the ingot mold. The flow of metal into each ingot mold 8 is controlled automatically in accordance with the resolidification rate of the metal within the ingot mold and hence the rate at which the ingot I is withdrawn by the feed rollers R. Since the speed of resolidification can be easily controlled, I prefer to maintain the ingot formation substantially constant and permit the liquid feed rate to adjust itself accordingly.

As illustrated in FIG. 1, the ingot mold 8 is a unit independent of the melting crucible 1 but hermetically sealed to the latter. Thus it is possible to change the ingot molds 8 for others of different profiles without making any material change in the crucible structure. In fact, the shutter 5 may simply be closed off and another ingot mold attached to the discharge tube 6 of the crucible. Regardless of the cross-section of the ingot mold, therefore, the ingot will be formed at a rate controlled by the pressure relationship discussed above and this may be established to avoid vortex formation within the crucible 1. Since the ingot mold 8 is open at both ends and the discharge tube 7 extends freely into the upper end of the ingot mold without engaging the walls thereof, there is formed a free surface of the metal or of a slag layer in the annular space around the tube 7 and within the ingot mold 8. This free surface receives a gas pressure equal to the effective pressure or head of the column of liquid metal and slag overlying the meniscus M. Should the head increase, I provide means for increasing the counterbalancing pressure 10 as will be apparent hereinafter.

A duct 11 connected to a source of gas (e.g. nitrogen, hydrogen, carbon monoxide, methane) under pressure via a valve 11a, opens into the chamber 10a to establish the gas cushion 10 which bears downwardly upon the free surface of the metal or slag within the ingot mold 8. The space 10 is hermetically sealed against the ambient atmosphere by the ingot mold 8 and the crucible 1 as illustrated in FIG. 1. Sealed joints, not illustrated may be provided in the regions in which the housing 10a bears against the crucible and ingot mold. Alternatively, I may provide a cover upon the ingot mold 8 which sealingly engages the spigot formed by the tube 7. As long as the liquid metal solidifies at the rate the liquid is supplied the pressure at the free surface of the metal and the position of the meniscus M will remain constant and independent of the quantity of metal flowing into the ingot mold 8. The ingot may pass through the latter solely as a result of its weight or by the combined effect of its weight and the engagement of the ingot by the rollers R.

To permit the pressure in chamber 10 to equal the head of metal and, therefore, compensate any changes in the head resulting from increase in the level of the metal bath and the overlying flux/slag layer within the crucible, I provide a branch 12 of conduit 11 which opens into the crucible at a perforated ceramic plug 13. The pressure in chamber 10 is thus held at a level which is equal to the head if the resistance of flow of the gas through the plug 13 is adjusted with respect to the difference in heights between the plug 13 and the walls of tube 7. Hence any increase in pressure within chamber 10 beyond that required to plunge the head results in a bleeding of gas from the plug 13. On the other hand, the reduction of the level in the crucible 1 also causes an increased flow of gas from plug 13 and branch 12. The pressure supplied at duct 11 may be adjusted to maintain a slight flow continuously from plug 13 so that any increased height of the bath will result in a proportional increase in the pressure within chamber 10. By adjustment of the pressure balance, moreover, it is possible to establish the meniscus at any location within the ingot mold 8 as may be desired. In addition, I may provide means represented at 2a to sense the level of liquid within the crucible 1 and control the valve 11a for independent regulation of pressure. Furthermore, the valve V connects the actuator 6 with the chamber 10 for automatic cutoff of the flow of liquid should the meniscus level rise suddenly as a result of a pressure drop in chamber 10 or a related danger condition in the crucible. Another sensor 8a' can be provided for the valve 11a if it is desired to maintain the meniscus at a fixed location under all circumstances.

By maintaining permanently a slight excess pressure in the gas in line 11 so that there is a tendency for the gas to vent from the porous plug 13, it is possible to balance any tendency of the meniscus to rise or fall as indicated earlier. The invention has been described as it is applicable to an ESR technique for the electroslag remelting of metal using consumable electrodes under a flux/slag submerging layer. The process may be equally applicable nonconsumable electrodes and/or to electroslag melting (ESM) in which raw material is iron powder or sponge-iron powder. Furthermore, the system has been found to be most effective in the production of elongated bodies of small cross-section whether square, rectangular or circular and permits progressive solidification independent of melting.

The improvement described and illustrated is believed to admit of many modifications within the ability of persons skilled in the art, all such modifications being considered within the spirit and scope of the invention except as limited by the appended claims.

I claim:

1. An apparatus for producing elongated metal bodies, comprising an electroslag melting crucible adapted to receive a bath of metal overlain by a flux/slag layer, said crucible being at least one downwardly extending discharge tube; a replaceable ingot mold open at its extremities and surrounding said tube with clearance while communicating with said tube to receive a stream of molten metal therefrom and form a continuously solidifying ingot from said metal whereby the liquid metal of said stream forms a meniscus within said ingot mold directly adjacent the lower end of said discharge tube; means forming a gas pressure chamber above said meniscus for applying to the liquid metal in said ingot mold and emerging from said tube a gas pressure approximately balancing the liquid head of said bath and said layer above said meniscus whereby the liquid metal enters said ingot mold at a rate automatically adjusted to the rate at which said ingot is formed; and sensing means responsible to the position of said meniscus for controlling said gas pressure to maintain said meniscus adjacent said end to prevent free fall of liquid metal from said tube.

2. An apparatus for producing elongated metal bodies comprising;

an electroslag melting crucible adapted to receive a bath of metal overlain by a flux/slag layer, said crucible having at least one downwardly extending discharge tube;

a replaceable ingot mold open at its extremities and surrounding said tube with clearance while communicating with said tube to receive a stream of molten metal therefrom and form a continuously solidifying ingot from said metal whereby the liquid metal of said stream forms a meniscus within said ingot mold;

means forming a gas pressure chamber above said meniscus for applying to the liquid metal in said ingot mold and emerging from said tube a gas pressure approximately balancing the liquid head of said bath and said layer above said meniscus whereby the liquid metal enters said ingot mold at a rate automatically adjusted to the rate at which said ingot is formed;

conduit means supplying a nonoxidizing gas under pressure to said chamber; and means responsive to the level of said layer and said bath in said crucible for controlling the pressure in said chamber, the last mentioned means including a branch of said conduit means communicating with said crucible below the level of the bath therein, and a porous plug at said branch.

3. The apparatus defined in claim 2 wherein said ingot mold is formed at least in the region of said meniscus with thermally insulating walls.

4. The apparatus defined in claim 2, further comprising means for heating the walls of said ingot mold at least in the region of said meniscus.

5. The apparatus defined in claim 2, further comprising means for cooling at least the portion of said ingot mold downstream of said meniscus in the direction of movement of said ingot through said ingot mold.

6. The apparatus defined in claim 2, further comprising means responsive to the position of said meniscus for controlling the pressure in said chamber.

7. The apparatus defined in claim 2, wherein said tube is composed at least in part of thermally insulating material.

8. The apparatus defined in claim 2, further comprising means for heating said tube.

9. The apparatus defined in claim 2, further comprising shutter means for closing said tube upon the level of said meniscus varying beyond a predetermined point.

10. The apparatus defined in claim 2, further comprising shutter means responsive to the pressure in said chamber for blocking said tube upon a variation in pressure therein beyond a predetermined level.

* * * * *